United States Patent

Ohashi et al.

[11] Patent Number: 6,118,558
[45] Date of Patent: *Sep. 12, 2000

[54] COLOR IMAGE FORMING METHOD AND APPARATUS

[75] Inventors: Kazuhito Ohashi; Shinobu Arimoto, both of Yokohama; Takashi Suzuki, Tokyo; Yoshiki Uchida, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/381,650

[22] Filed: Jan. 31, 1995

[30] Foreign Application Priority Data

Jan. 31, 1994 [JP] Japan .................................. 6-010024
Mar. 31, 1994 [JP] Japan .................................. 6-064051

[51] Int. Cl.[7] .................................. G03F 3/08; H04N 1/46
[52] U.S. Cl. .......................... 358/518; 358/501; 358/529
[58] Field of Search ..................................... 358/500, 501, 358/518, 529, 515, 517, 530, 538, 442, 448

[56] References Cited

U.S. PATENT DOCUMENTS

| | | | |
|---|---|---|---|
| 4,831,409 | 5/1989 | Tatara et al. | 364/526 |
| 4,958,219 | 9/1990 | Kadowaki | 358/75 |
| 5,128,748 | 7/1992 | Murakami et al. | 358/518 |
| 5,136,372 | 8/1992 | Nakatani et al. | 358/518 |
| 5,345,320 | 9/1994 | Hirota | 358/518 |
| 5,359,437 | 10/1994 | Hibi | 358/529 |
| 5,369,510 | 11/1994 | Tagughi | 358/529 |
| 5,386,305 | 1/1995 | Usami | 358/518 |
| 5,502,579 | 3/1996 | Kita et al. | 358/518 |

FOREIGN PATENT DOCUMENTS

| | | |
|---|---|---|
| 0497325 | 8/1992 | European Pat. Off. . |
| 0562596 | 9/1993 | European Pat. Off. . |
| 0 665 674 | 2/1995 | European Pat. Off. ......... H04N 1/52 |
| 0 665 678 | 2/1995 | European Pat. Off. ......... H04N 1/60 |
| 0 665 679 | 2/1995 | European Pat. Off. ......... H04N 1/60 |
| 6-54176 | 2/1994 | Japan . |

*Primary Examiner*—Thomas D. Lee
*Attorney, Agent, or Firm*—Fitzpatrick, Cella, Harper & Scinto

[57] ABSTRACT

When an image from a scanner or an external apparatus is to be printed out, in order to achieve both high color reproducibility and high gray reproducibility, a black signal is extracted from an input color image signal, the ratio of the extracted black signal to the color image signal is changed in accordance with an input instruction, and an output operation is performed in accordance with the extracted black signal and the color image signal. When a color image signal is formed by scanning an image, a black signal is extracted from the color image signal, a high-frequency component of the extracted black signal is removed, and an output operation is performed in accordance with the black signal, from which the high-frequency component is removed, and with the color image signal.

10 Claims, 19 Drawing Sheets

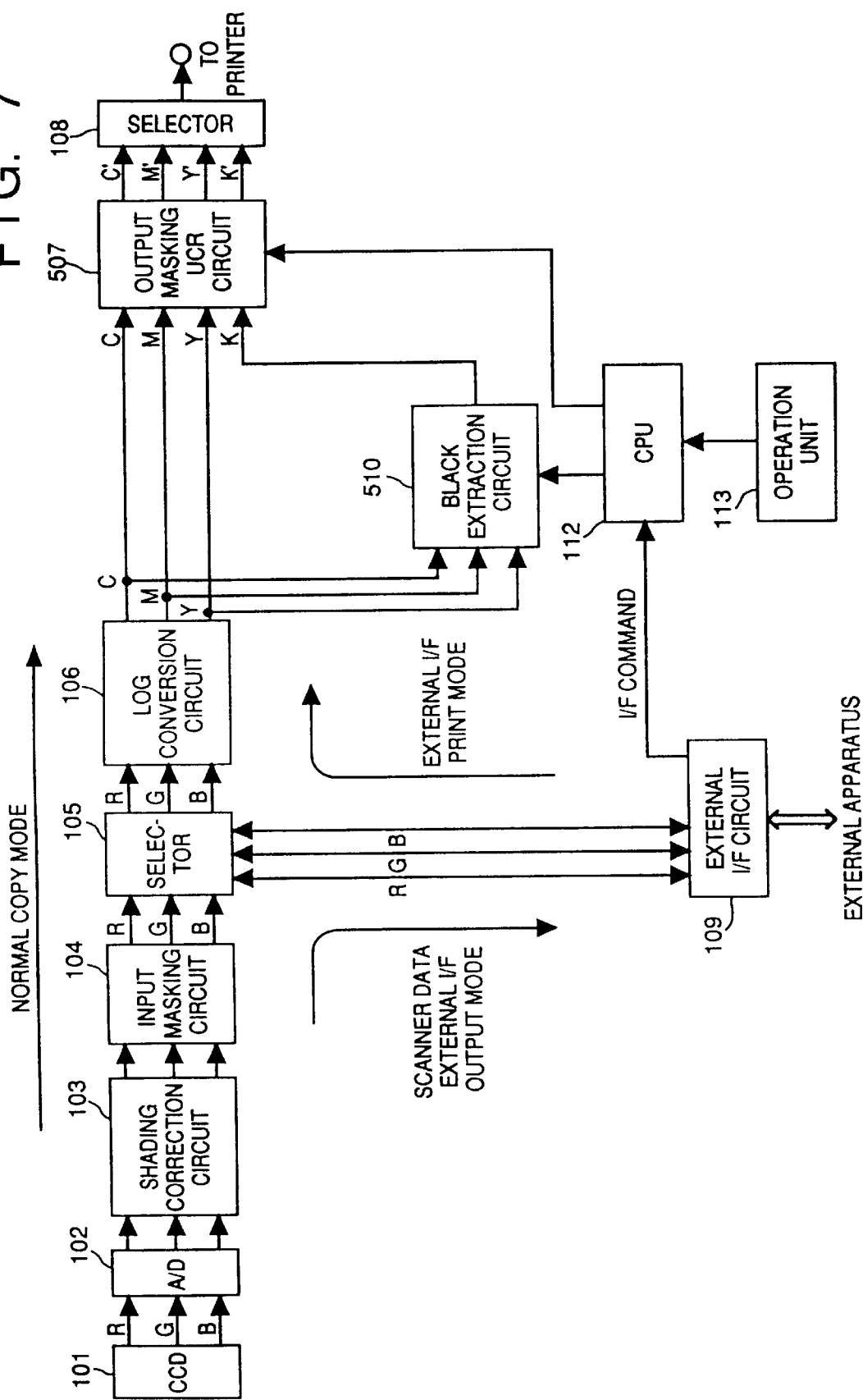

FIG. 8

| PRINT METHOD | TYPE (MODE) OF IMAGE | BLACK EXTRACTION METHOD | OUTPUT MASKING | MODE SETTING METHOD |
|---|---|---|---|---|
| NORMAL COPY | NORMAL IMAGE MODE | min (CMY) | MASKING COEFFICIENT 1 | SET BY OPERATION UNIT |
|  | CHARACTER MODE / MAP MODE | EQUATION (3-1) | MASKING COEFFICIENT 2 |  |
| PRINT IMAGE FROM EXTERNAL I/F (PART 1) | NORMAL IMAGE MODE | min (CMY) | MASKING COEFFICIENT 1 | SET BY OPERATION UNIT OR EXTERNAL I/F COMMAND |
|  | CG / CHARACTER MAP MODE | EQUATION (3-1) | MASKING COEFFICIENT 2 |  |
| PRINT IMAGE FROM EXTERNAL I/F (PART 2) | ONLY NORMAL IMAGE | min (CMY) | MASKING COEFFICIENT 1 | ALWAYS IN EXTERNAL I/F PRINT MODE |
| PRINT IMAGE FROM EXTERNAL I/F (PART 3) | ONLY CG / CHARACTER MAP MODE | EQUATION (3-1) | MASKING COEFFICIENT 2 | ALWAYS IN EXTERNAL I/F PRINT MODE |

EQUATION (3-1) : $\min \{\min/\max + (1-\min/\max)(\min/255)^2\}$

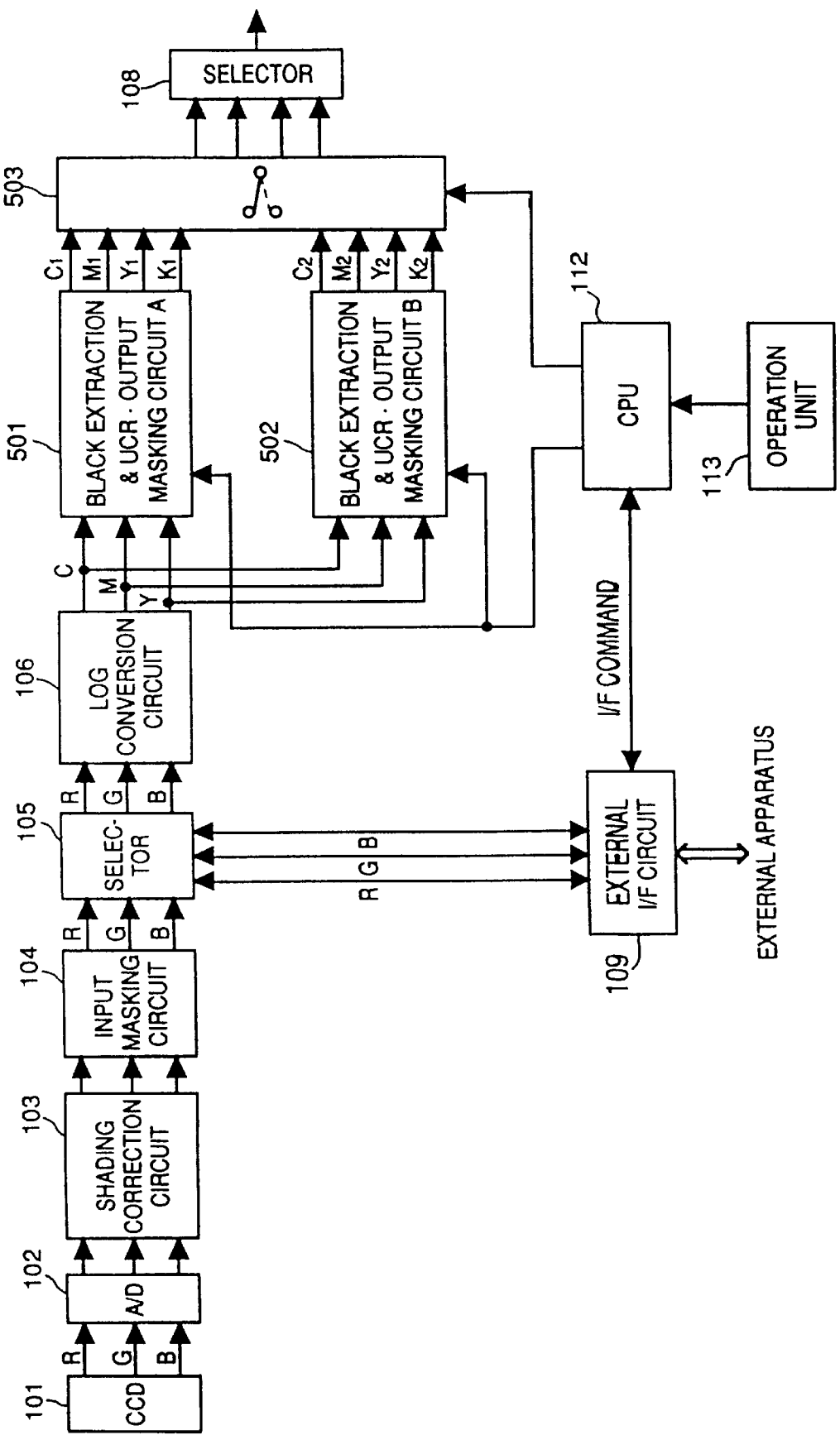

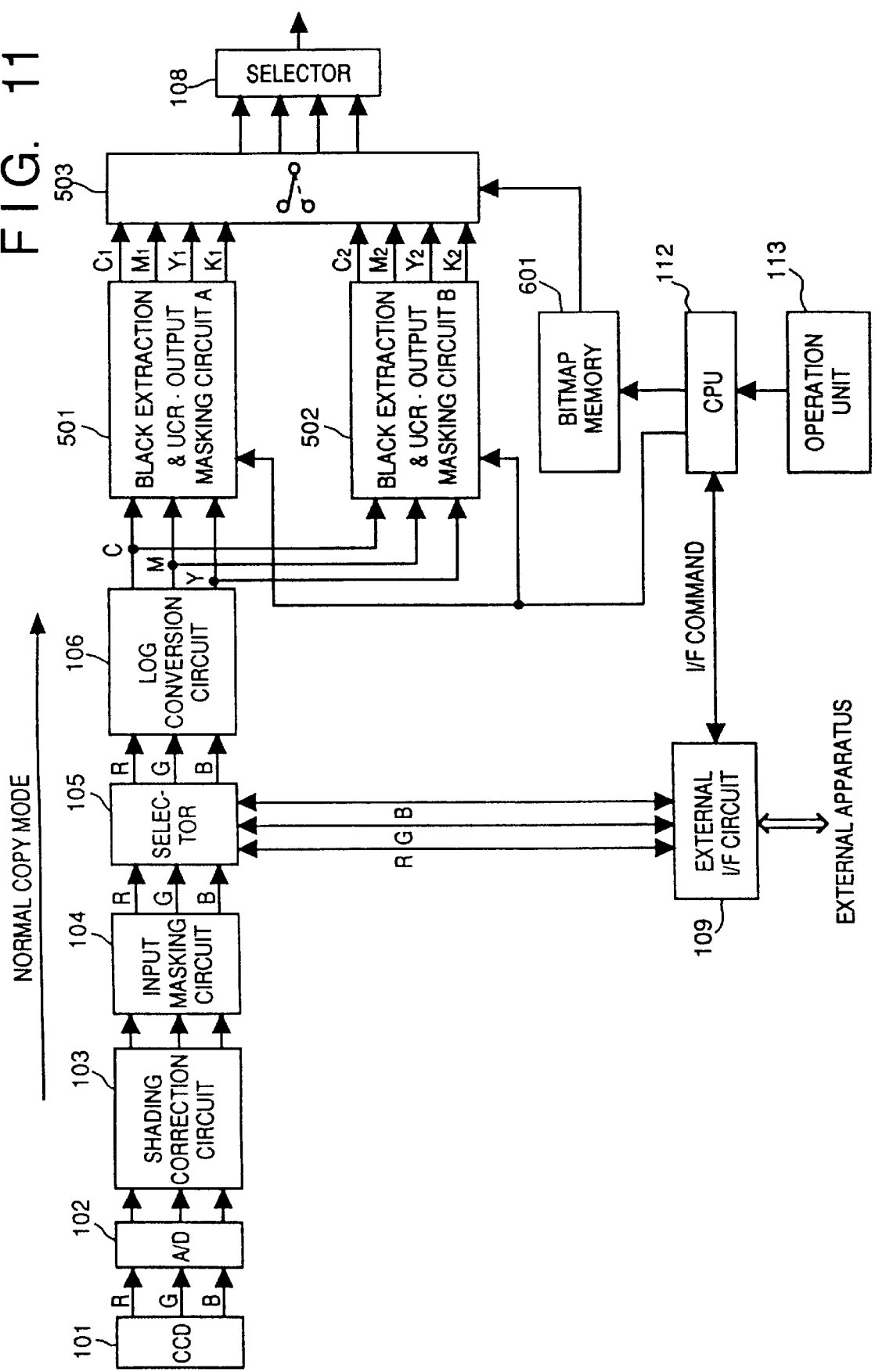

FIG. 12

| PRINT METHOD | TYPE (MODE) OF IMAGE | BLACK EXTRACTION METHOD | OUTPUT MASKING | MODE SETTING METHOD |
|---|---|---|---|---|
| NORMAL COPY | NORMAL IMAGE MODE | min (CMY) | MASKING COEFFICIENT 1 | SET BY OPERATION UNIT |
| | CHARACTER IMAGE MODE | EQUATION (3-1) | MASKING COEFFICIENT 2 | |
| | MAP IMAGE MODE | EQUATION (3-1) | MASKING COEFFICIENT 3 | |
| PRINT IMAGE FROM EXTERNAL I/F (PART 1) | NORMAL IMAGE MODE | min (CMY) | MASKING COEFFICIENT 1 | SET BY OPERATION UNIT OR EXTERNAL I/F COMMAND |
| | CHARACTER IMAGE MODE | EQUATION (3-1) | MASKING COEFFICIENT 2 | |
| | MAP IMAGE MODE | EQUATION (3-1) | MASKING COEFFICIENT 3 | |
| | CG IMAGE MODE | EQUATION (3-1) | MASKING COEFFICIENT 4 | |
| PRINT IMAGE FROM EXTERNAL I/F (PART 2) | NORMAL IMAGE MODE | min (CMY) | MASKING COEFFICIENT 1 | ALWAYS IN EXTERNAL I/F PRINT MODE |
| PRINT IMAGE FROM EXTERNAL I/F (PART 3) | MAP IMAGE MODE | EQUATION (3-1) | MASKING COEFFICIENT 2 | ALWAYS IN EXTERNAL I/F PRINT MODE |
| PRINT IMAGE FROM EXTERNAL I/F (PART 4) | MAP IMAGE MODE | EQUATION (3-1) | MASKING COEFFICIENT 3 | ALWAYS IN EXTERNAL I/F PRINT MODE |
| PRINT IMAGE FROM EXTERNAL I/F (PART 5) | CG IMAGE MODE | EQUATION (3-1) | MASKING COEFFICIENT 4 | ALWAYS IN EXTERNAL I/F PRINT MODE |

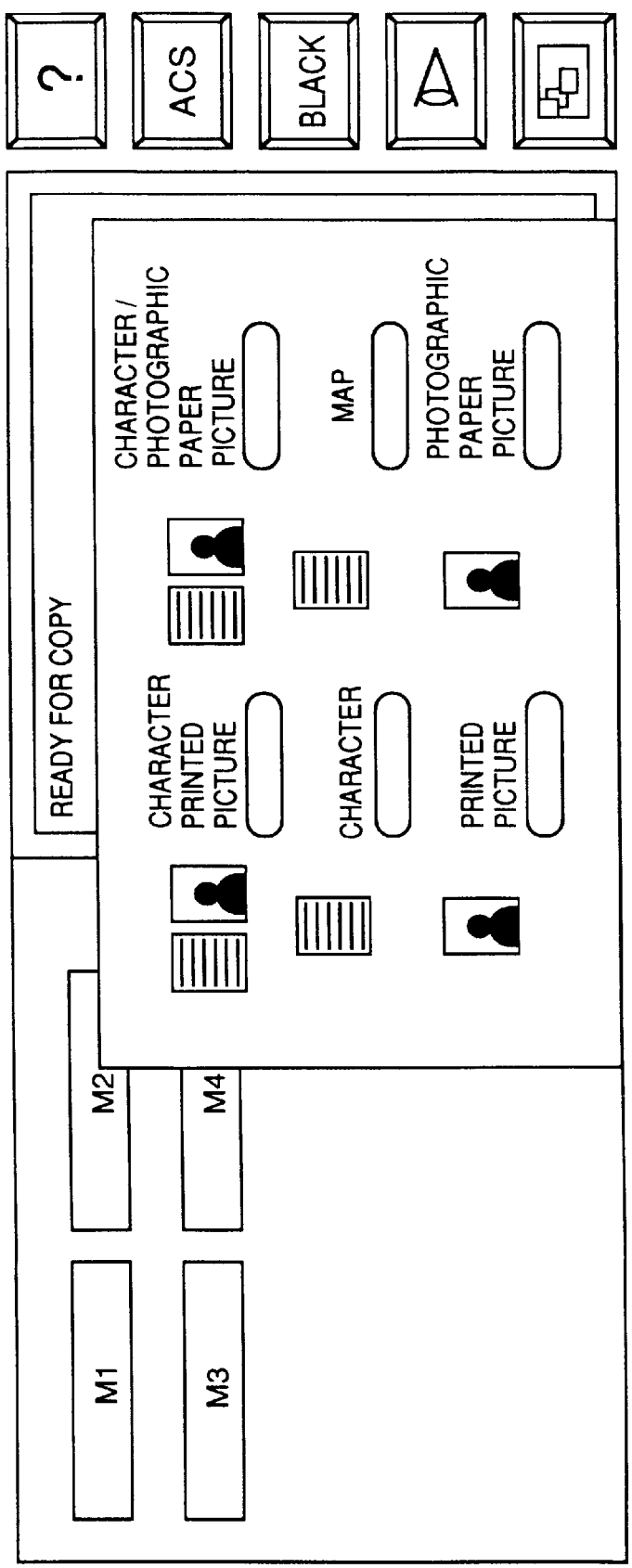

ARRANGEMENT (IN CASE OF LINEAR ARRANGEMENT)

OPERATION

COLOR IMAGE FORMING METHOD AND APPARATUS

BACKGROUND OF THE INVENTION

Field of the Invention

The present invention relates to an image forming method and apparatus for printing out, e.g., image data output from a scanner and image data output from an external apparatus and, more particularly, to an apparatus for printing out color image data.

As a color image forming apparatus for printing out image data output from, e.g., a scanner, a computer, or the like, a color copying machine has been conventionally proposed.

Colors to be finally printed by a color copying machine are four colors, i.e., C, M, Y, and K, and the color copying machine performs signal processing for converting R, G, and B image data output from a scanner or an external apparatus such as a computer into C, M, Y, and K data.

However, the conventional color copying machine suffers the following problems.

Upon conversion from R, G, and B→C, M, Y, and K (LOG conversion, black extraction, output masking, UCR), when the UCR amount is large, the ratio of K becomes high as compared to the amounts of C, M, and Y on a gray (white/black) portion of an image. Especially on a highlight gray portion (light gray portion) in a "normal copy mode", the noise amount increases due to light shot noise on a CCD (which noise is proportional to a square of the amount of light incident on the CCD and becomes larger as the gray portion is lighter), and this noise is included in a K signal having the highest ratio of C, M, Y, and K data by black extraction and output masking·UCR processing. As a result, "granularity" of an image becomes conspicuous.

It is empirically known that the "granularity" of an image can be eliminated by changing the coefficients used in the output masking·UCR processing to decrease the ratio of the K signal and to increase the ratios of the C, M, and Y signals. However, with this processing, when C. G. image data (including no noise) created by a computer is to be printed out via an external I/F, or when gray characters (character document or characters included in a map) are to be printed out even in a normal copy mode, the C, M, and Y colors on a gray (white/black) portion are recorded at relatively higher ratios, and the gray portion is printed in gray with a color appearance, thus impairing gray reproduction upon printing of a C. G. image.

As a method of extracting a K signal from C, M, and Y signals, a scheme designed for optimizing K data in a C. G. image, a character document, and a character portion of a map document (further improving gray reproducibility) is available (to be described in detail in the embodiment of the present invention). However, such a new black extraction method has a nature of emphasizing a noise component in a normal natural image, thus posing another problem.

SUMMARY OF THE INVENTION

It is an object of the present invention to solve the conventional problems.

It is another object of the present invention to provide an image forming method which can achieve both high color reproducibility and high gray reproducibility when various images are input from various apparatuses.

In order to achieve the above objects, according to an aspect of the present invention, there is provided an image forming apparatus comprising: (a) extraction means for extracting a black signal from an input color image signal; (b) changing means for changing a ratio of the black signal extracted by said extraction means to the color image signal in accordance with an input instruction; and (c) image forming means for performing an output operation in accordance with the black signal extracted by said extraction means and the color image signal. According to another aspect of the present invention, there is provided an image forming apparatus comprising: (a) a scanner for forming a color image signal by scanning an image; (b) extraction means for extracting a black signal from the color image signal; (c) removing means for removing a high-frequency component of the black signal extracted by said extraction means; and (d) image forming means for performing an output operation in accordance with the black signal, from which the high-frequency component is removed, and with the color image signal.

The above and other objects and features of the present invention will become apparent from the following detailed description of the embodiments of the present invention taken in conjunction with the accompanying drawings.

BRIEF DESCRIPTION OF THE DRAWINGS

FIG. 7 is a block diagram showing the arrangement of a signal processing circuit of a color copying machine according to the fifth embodiment of the present invention;

FIG. 8 is a table showing a black extraction method and output masking coefficients which are set in correspondence with each print method and each type (mode) of an image in the circuit shown in FIG. 7;

FIG. 9 is a block diagram showing the arrangement of a signal processing circuit of a color copying machine according to the sixth embodiment of the present invention;

FIG. 11 is a block diagram showing the arrangement of a signal processing circuit of a color copying machine according to the seventh embodiment of the present invention;

FIG. 12 is a table showing another example of a method of determining a black extraction method and output masking coefficients;

FIG. 13 is a view showing another example of the mode setting operation screen;

DETAILED DESCRIPTION OF THE PREFERRED EMBODIMENTS

The preferred embodiments of the present invention will be described in detail hereinafter with reference to the accompanying drawings.

First Embodiment

Figure 1:
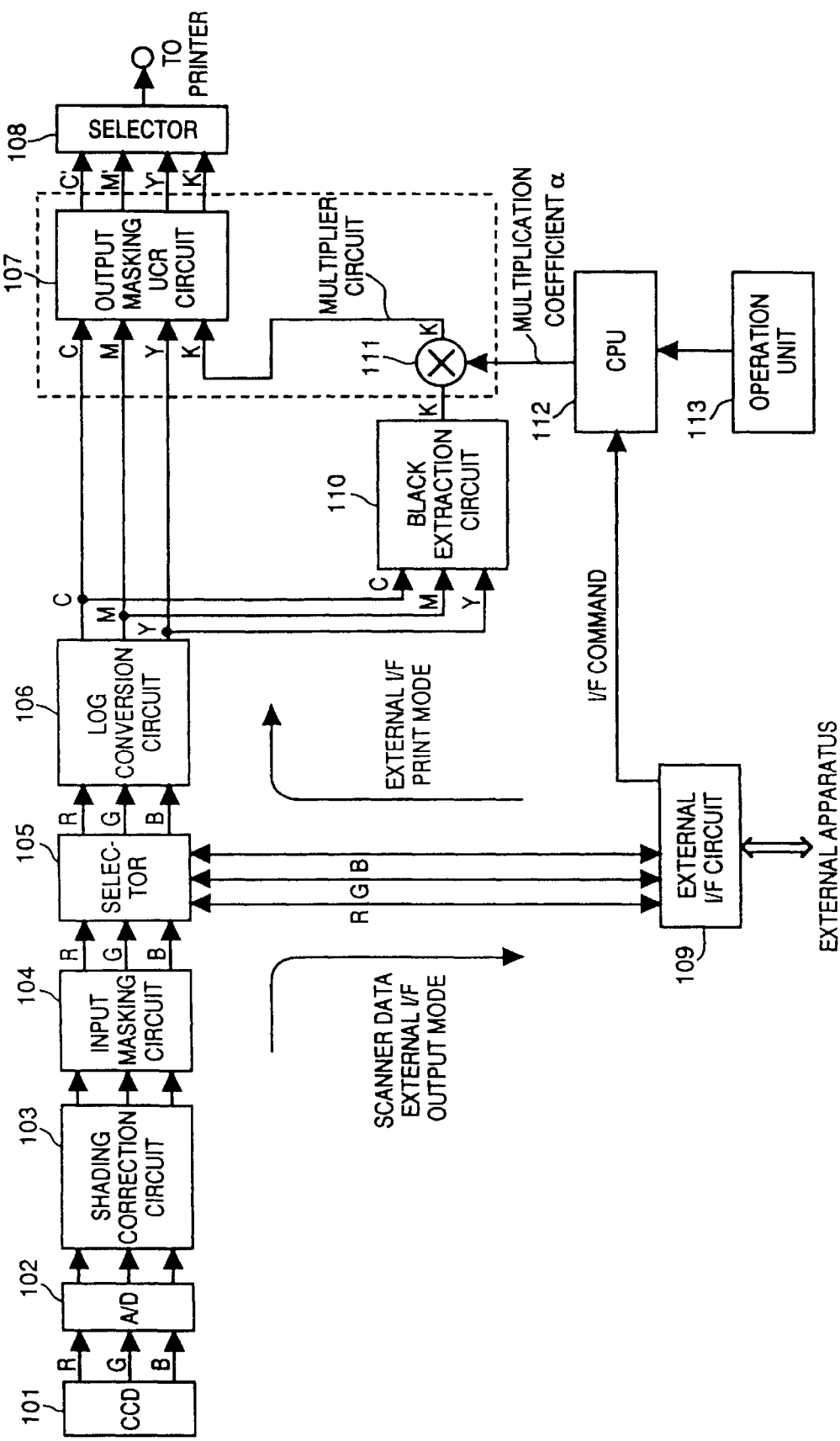
FIG. 1 is a block diagram showing the arrangement of a signal processing circuit of a color copying machine according to the first embodiment of the present invention.

FIG. 1 is a block diagram showing the arrangement of a signal processing circuit of a color copying machine according to the first embodiment of the present invention.

Referring to FIG. 1, reference numeral 101 denotes a CCD; 102, an A/D converter; 103, a shading correction circuit; 104, an input masking circuit; 105, a selector; 106, a LOG conversion circuit for achieving RGB→CMY conversion; 107, an output masking·UCR (undercolor removal) circuit; 108, a selector for selecting one of C', M', Y', and K' output from the output masking·UCR circuit 107 and outputting the selected color data to a printer (not shown) (since the printer frame-sequentially records C, M, Y, and K data); 110, a black extraction circuit for extracting K from C, M, and Y data; 109, an external I/F circuit; 111, a multiplier circuit; 112, a control CPU; and 113, an operation unit of this color copying machine. The selector 105 is used for switching the flow of an image signal in correspondence with a "normal copy mode" (when image data output from the CCD 101 is to be printed), a "scanner data external I/F output mode" (when image data output from the CCD 101 is output via the external I/F circuit 109), and an "external I/F print mode" (when image data supplied from the external I/F circuit 109 is to be output).

The signal processing of the color copying machine with the above-mentioned arrangement will be explained below.

Image pickup signals from the CCD 101 are converted into digital signals by the A/D converter 102, and the digital signals are subjected to correction of shading caused by a light amount nonuniformity of an optical system, a sensitivity variation in units of pixels of the CCD, and the like in the shading correction circuit 103. The corrected signals are subjected to masking processing using a matrix calculation in the input masking circuit 104. The processed signals are then input to the selector 105.

In the "scanner data external I/F output mode", the selector 105 outputs image data (R, G, and B) from the CCD 101 to an external apparatus via the external I/F circuit 109.

In the "normal copy model", the selector 105 supplies the image data (R, G, and B) from the CCD 101 to the LOG conversion circuit 106. The LOG conversion circuit 106 performs RGB→CMY conversion (e.g., conversion using a table), and outputs three color signals C, M, and Y. These three color signals C, M, and Y are input to the output masking·UCR circuit 107, and are also input to the black extraction circuit 110. A K (black) signal extracted by the black extraction circuit 110 is also input to the output masking·UCR circuit 107 via the multiplier circuit 111 (to be described later).

The black extraction circuit 110 outputs, e.g., min[C, M, Y] (a minimum value of the three signals C, M, and Y) as K.

The output masking·UCR circuit 107 achieves an output masking calculation and an UCR (undercolor removal, i.e., subtracting a K signal component from color signals C, M, and Y) in a single matrix calculation. One of outputs C', M', Y', and K' from the output masking·UCR circuit 107 is selected by the selector 108, and is supplied to a printer which frame-sequentially prints color images.

In the "external I/F image data print mode", the selector 105 inputs image data (R, G, and B) from the external apparatus to the LOG conversion circuit 106, and the input data are supplied to the printer via the above-mentioned processing.

The operation for eliminating any "granularity" of an image by changing the ratio of the extracted K signal in the above-mentioned color copying machine will be explained below.

The K signal extracted by the black extraction circuit 110 is input to the multiplier circuit 111, and a product of the K signal and a multiplication coefficient α from the CPU 112 obtained by the circuit 111 is input to the output masking-UCR circuit 107.

Since the first embodiment adopts the above-mentioned arrangement, the ratio of the K signal to the C, M, and Y signals can be varied by the multiplication coefficient α to be multiplied with the K signal. The value α can be changed by a command instruction input from the external apparatus via the external I/F circuit 109 or an instruction from the operation unit 113. By a decision of a user himself or herself, when image data free from a noise component such as a character signal input from the external apparatus such as a computer is to be printed, the value α is set to be large (made close to "1"); when image data output from a scanner is to be printed, the value αis set to be small (made close to "0"). Alternatively, when image data output from α scanner is to be printed, a predetermined optimal value a (which can eliminate granularity) is automatically set.

In this manner, when image data output from a scanner is to be printed, the value α is set to be smaller than that set when image data output from the external apparatus is to be printed, thereby reducing K signal components which contribute to conspicuous "granularity", and eliminating the "granularity". On the other hand, when external image data free from noise is to be printed, or when a character portion, a map, or the like of image data even from the scanner is to be printed, the value α is set to be large to maintain high gray reproducibility (to prevent recording of gray with a color appearance).

Second Embodiment

The second embodiment which eliminates the "granularity" of an image by changing the ratio of an extracted K signal in a color copying machine will be described below.

Figure 2:
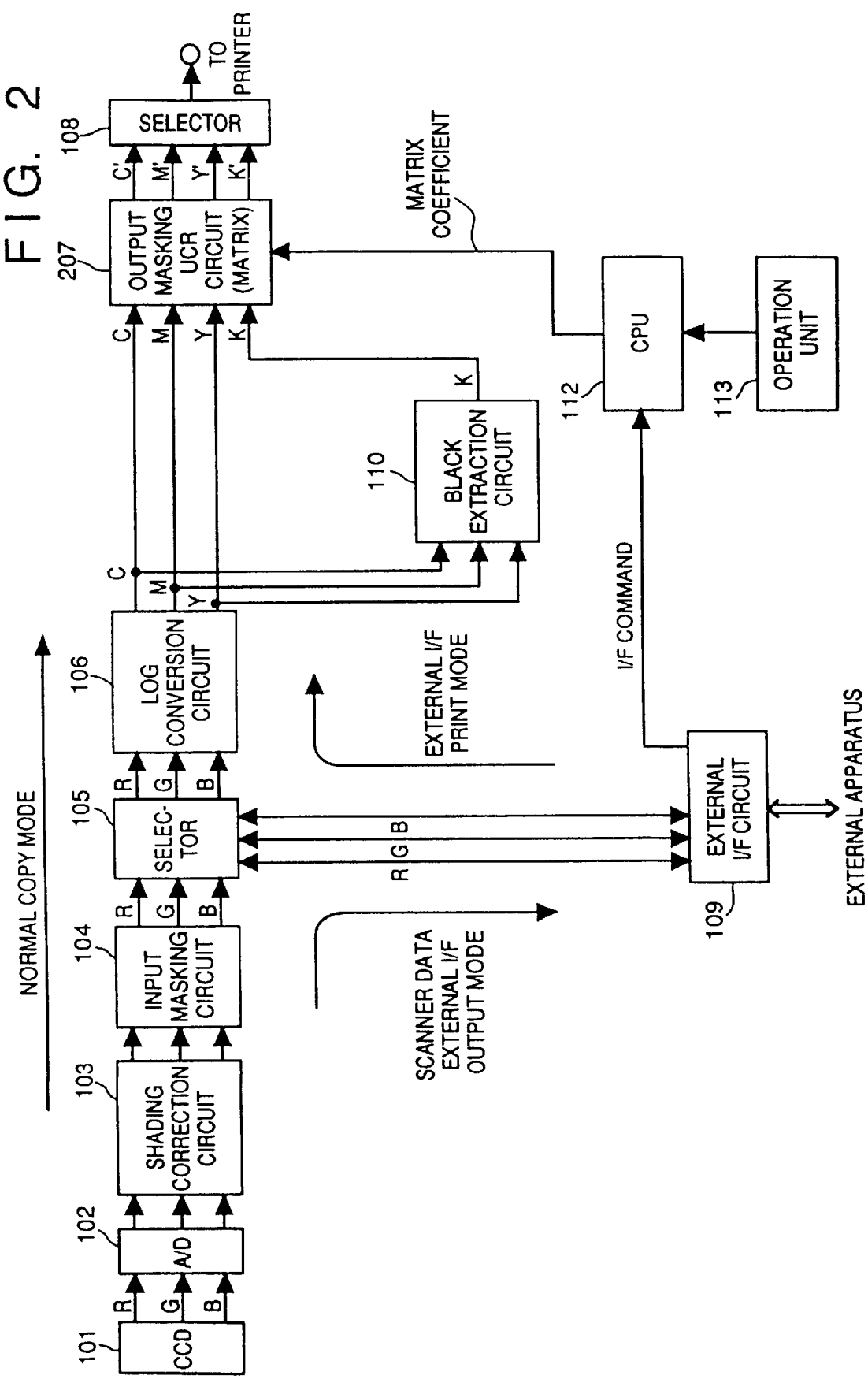
FIG. 2 is a block diagram showing the arrangement of a signal processing circuit of a color copying machine according to the second embodiment of the present invention.

FIG. 2 is a block diagram showing the arrangement of a signal processing circuit of a color copying machine according to the second embodiment. In the first embodiment, a K signal component extracted by the black extraction circuit 110 is multiplied with the multiplication coefficient α by the multiplier circuit 111, while in the second embodiment, a similar calculation is achieved by an output masking·UCR circuit 207.

The output masking·UCR circuit 107 shown in FIG. 1 normally performs the following matrix calculation:

$$\begin{bmatrix} C' \\ M' \\ Y' \\ K' \end{bmatrix} = \begin{bmatrix} a_{11} & a_{12} & a_{13} & a_{14} & a_{15} & a_{16} & a_{17} & a_{18} \\ a_{21} & a_{22} & a_{23} & a_{24} & a_{25} & a_{26} & a_{27} & a_{28} \\ a_{31} & a_{32} & a_{33} & a_{34} & a_{35} & a_{36} & a_{37} & a_{38} \\ a_{41} & a_{42} & a_{43} & a_{44} & a_{45} & a_{46} & a_{47} & a_{48} \end{bmatrix} \times \begin{bmatrix} C \\ M \\ Y \\ K \\ CM \\ MY \\ YC \\ KK \end{bmatrix}$$

Therefore, to also perform a multiplication of a K signal by $\alpha$, the following calculation can be performed:

$$\begin{bmatrix} C' \\ M' \\ Y' \\ K' \end{bmatrix} = \begin{bmatrix} a_{11} & a_{12} & a_{13} & a_{14} & a_{15} & a_{16} & a_{17} & a\alpha & a_{18} \\ a_{21} & a_{22} & a_{23} & a_{24} & a_{25} & a_{26} & a_{27} & a\alpha & a_{28} \\ a_{31} & a_{32} & a_{33} & a_{34} & a_{35} & a_{36} & a_{37} & a\alpha & a_{38} \\ a_{41} & a_{42} & a_{43} & a_{44} & a_{45} & a_{46} & a_{47} & a\alpha & a_{48} \end{bmatrix} \times \begin{bmatrix} C \\ M \\ Y \\ K \\ CM \\ MY \\ YC \\ KK \end{bmatrix}$$

In this manner, when the CPU 112 sets the matrix coefficients in the output masking·UCR circuit 207, the same processing as in the first embodiment can be realized without using a multiplier circuit for multiplying a K signal with the multiplication coefficient $\alpha$.

Third Embodiment

The third embodiment which eliminates the "granularity" of an image by changing the ratio of an extracted K signal in a color copying machine will be described below.

Figure 3:
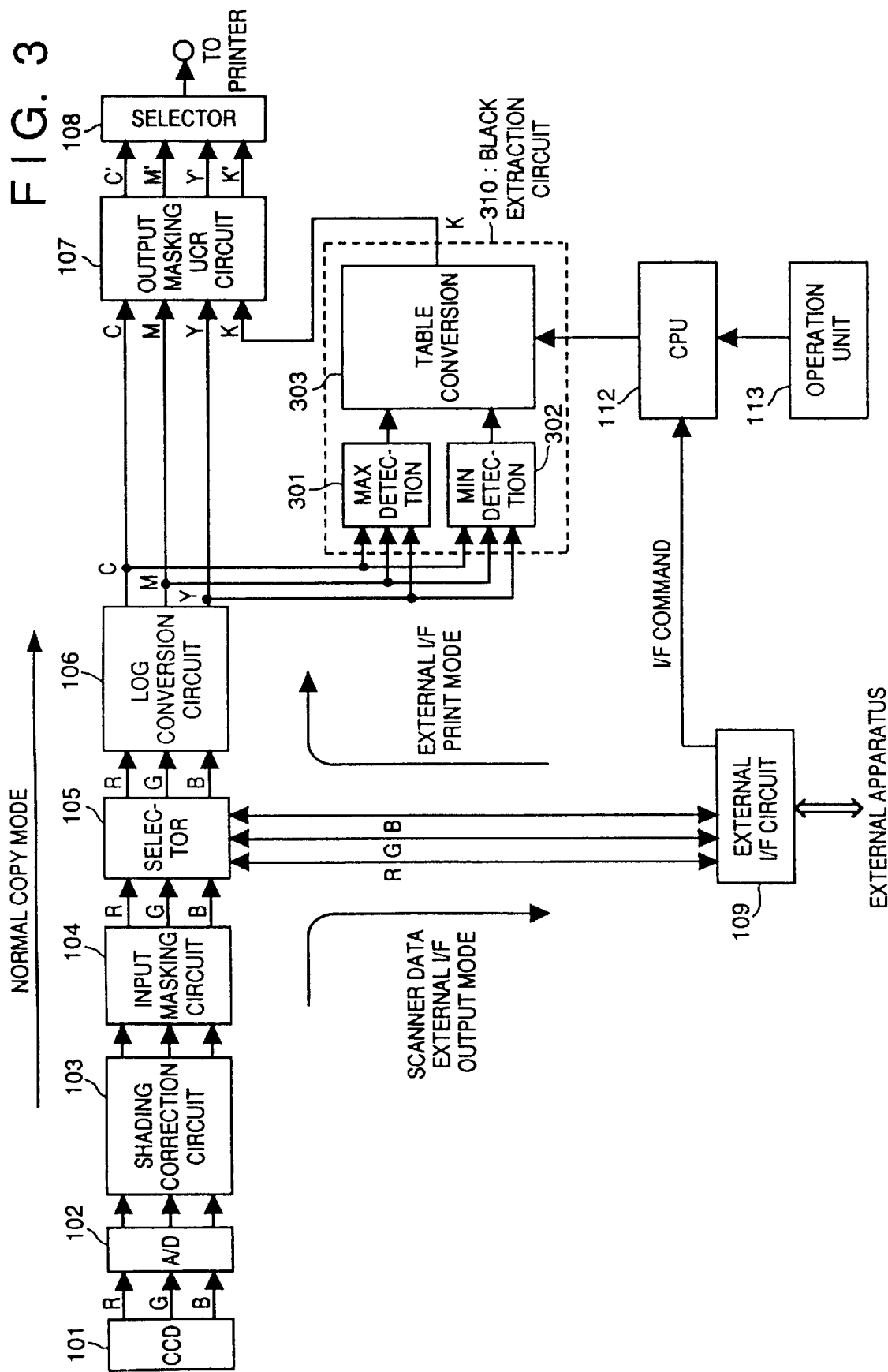
FIG. 3 is a block diagram showing the arrangement of a signal processing circuit of a color copying machine according to the third embodiment of the present invention.

FIG. 3 is a block diagram showing the arrangement of a signal processing circuit of a color copying machine according to the third embodiment. A black extraction circuit 310 shown in FIG. 3 extracts a K signal according to the following equation. In the following equation, min represents min(C, M, Y), and max represents max(C, M, Y).

$$K = \min\{\min/\max + (1-\min/\max)(\min/255)^2\} \quad (3\text{-}1)$$

In this equation, (min/max) is considered as a parameter "color appearance" {for example, since min and max values become close to each other on a gray portion, the value (min/max) becomes close to "1"; but since max >>min is satisfied as the gray portion has a color appearance, the value (min/max) becomes close to "0". Since a gray portion has a value (min/max)=1, K becomes equal to min, i.e., min(C, M, Y), and becomes equal to the above-mentioned black extraction equation. More specifically, (min/max) is an amount indicating grayishness, and $(\min/255)^2$ is an amount indicating darkishness. Note that $(\min/255)^2$ can be replaced by (min/255) or $(\min/255)^3$.

On the other hand, when an image portion has a strong color appearance, K becomes almost equal to min(min/255)$^2$. As a result, the extraction amount of K considerably decreases as compared to that obtained when K is equal to min(C, M, Y).

This is based on the principle that gray reproducibility on a gray portion is improved by increasing the ratio of a K signal as much as possible, and color reproducibility on a portion with a strong color appearance is improved by decreasing the ratio of a K signal as much as possible.

However, since equation (3-1) includes a division, it is difficult to achieve a high-speed hardware calculation. Thus, in practice, a MAX detection circuit 301 calculates max(C, M, Y), a MIN detection circuit 302 calculates min(C, M, Y), and a table conversion circuit 303 performs a calculation according to equation (3-1). As the table contents of the table conversion circuit 303, calculation contents according to equation (3-1) are written at the respective addresses by a calculation of the CPU 112 in advance. In this case, when the CPU 112 performs a calculation according to the following equation in place of equation (3-1), the same processing as in each of the above embodiments can be realized by changing the value of $\alpha$:

$$K = \alpha \cdot \{\min/\max + (1-\min/\max)(\min/255)^2\} \quad (3\text{-}2)$$

Fourth Embodiment

The fourth embodiment which eliminates the "granularity" of an image by changing the ratio of an extracted K signal in a color copying machine will be described below.

Figure 4:
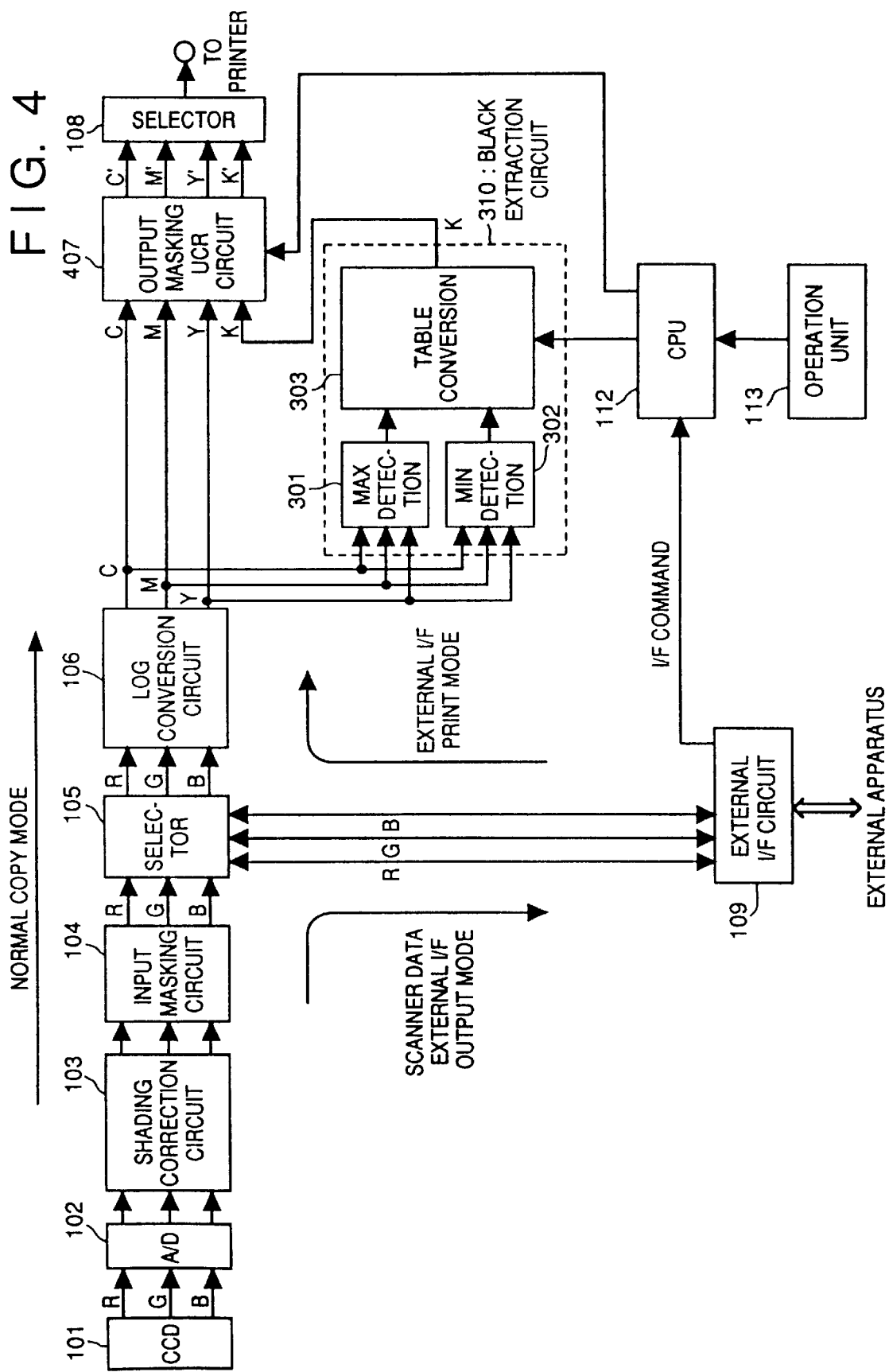
FIG. 4 is a block diagram showing the arrangement of a signal processing circuit of a color copying machine according to the fourth embodiment of the present invention.

FIG. 4 is a block diagram showing the arrangement of a signal processing circuit of a color copying machine according to the fourth embodiment. In the fourth embodiment, when the color appearance changes depending on the value of the coefficient $\alpha$ in equation (3-2) in the third embodiment, the color appearance correction can be realized by changing matrix coefficients in an output masking·UCR circuit 407.

Figure 5:
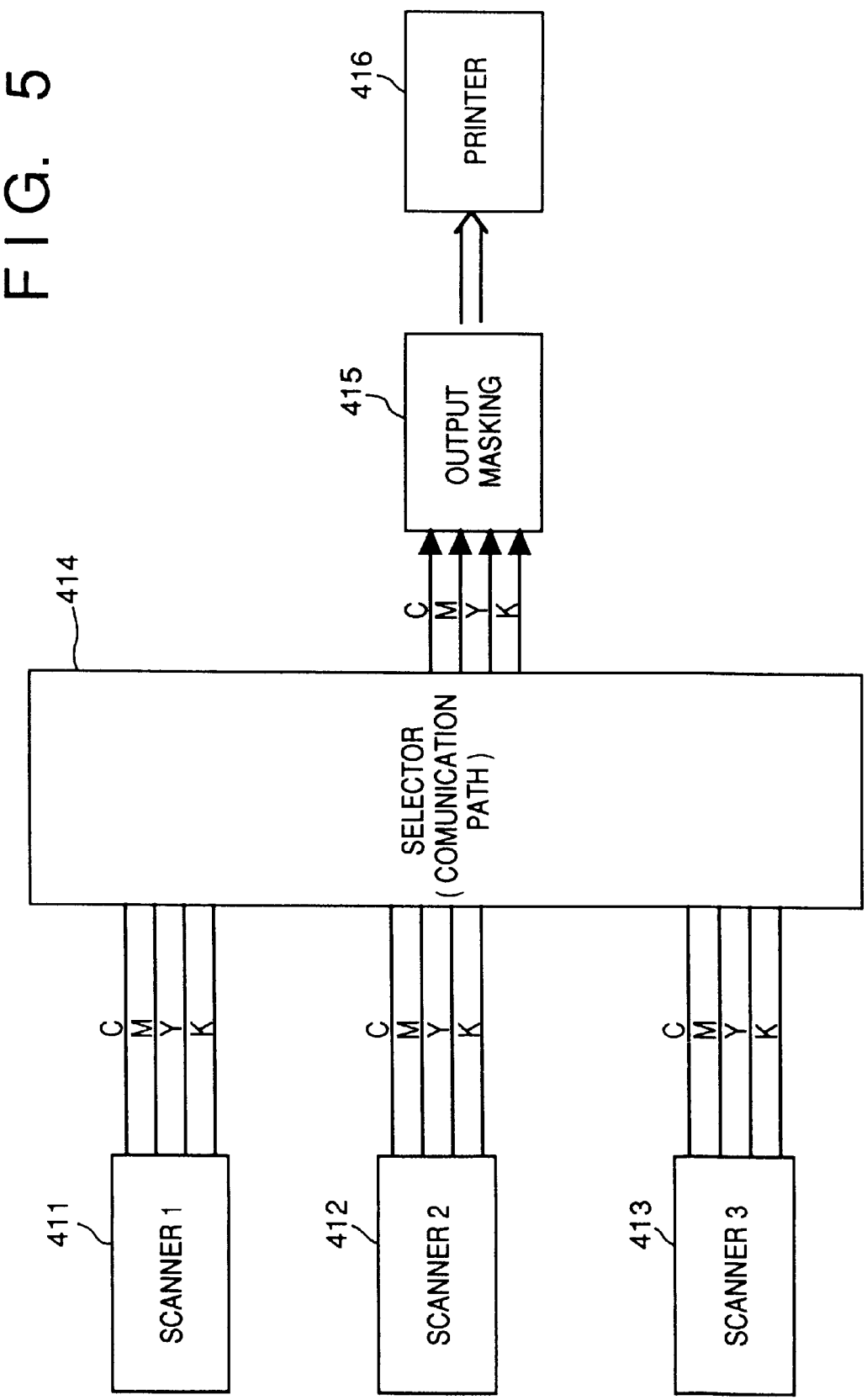
FIG. 5 is a block diagram for explaining an example for setting optimal coefficients for a plurality of scanners.

In this case, $\alpha = \alpha_1 \cdot \alpha_2$ may be assumed, and a result of multiplication by $\alpha_1$ may be set in the table conversion circuit 303. With this arrangement, when a plurality of scanners 411 to 413 are connected to a single printer 416 via a selector 414 or a communication path, as shown in, e.g., FIG. 5, matrix coefficients corresponding to a coefficient $\alpha_1$ suitable for one with the least noise generation amount of the three scanners 411 to 413 are set in an output masking circuit 415. When image data from another scanner is to be printed, a result of multiplication by $\alpha_2$ for compensating for the deficiency is given for a portion corresponding to the table conversion circuit 303 shown in FIG. 4, thus setting optimal values of $\alpha$ for all the scanners.

Figure 6:
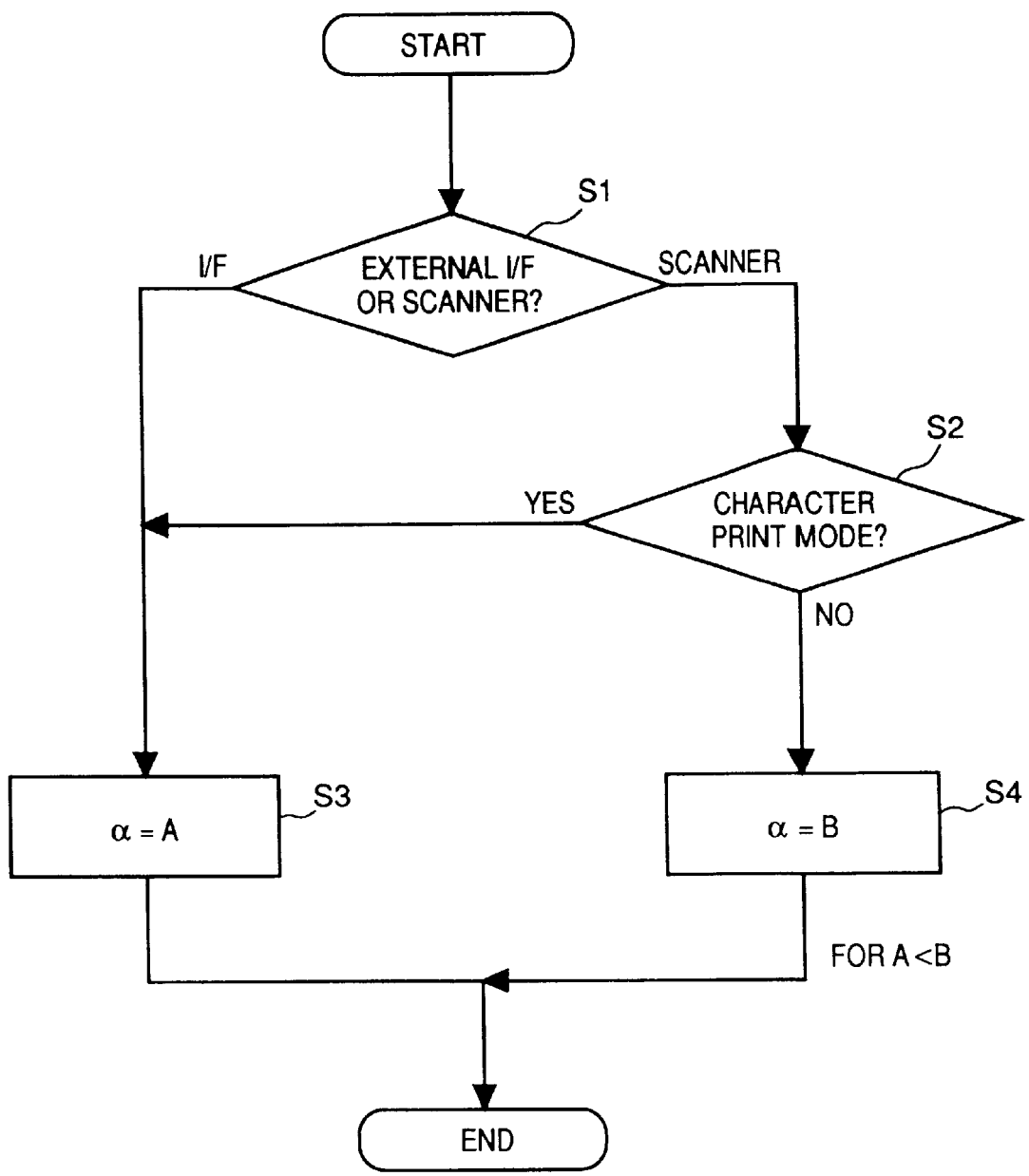
FIG. 6 is a flow chart for explaining a part of the operation of a CPU 112 in the circuits shown in FIGS. 1 to 4.

FIG. 6 is a flow chart showing an example of the $\alpha$ setting operation of the CPU 112 in each of the first to fourth embodiments described above.

As shown in FIG. 6, it is checked in step S1 if a mode for printing image data from the external I/F circuit or a mode for printing image data read by a scanner is selected. If it is determined in step S1 that the mode for printing image data from the external I/F circuit is selected, a relatively small value A is set as the value $\alpha$ in step S3.

On the other hand, in the normal copy mode for printing image data read by the scanner, it is checked in step S2 in accordance with an operation at the operation unit 113 if the apparatus is set in, e.g., a character copy (print) mode. In the character copy mode, A is set in $\alpha$ in step S3 described above. On the other hand, if the character copy mode is not selected, a value B sufficiently larger than A is set in $\alpha$ in step S4.

In the flow chart shown in FIG. 6, depending on the mode for printing image data from the external I/F circuit or the copy mode for printing image data read by the scanner, the value $\alpha$ may be uniquely set to be A or B.

Fifth Embodiment

FIG. 7 is a block diagram showing the arrangement of a signal processing circuit of a color copying machine according to the fifth embodiment of the present invention. The same reference numerals in FIG. 7 denote the same constituting elements as in FIGS. 1 to 4. Reference numeral 507 denotes a black extraction circuit which can switch the calculation equation used in black extraction in accordance with an instruction from the CPU 112; and 510, an output masking·UCR circuit which can similarly switch the matrix coefficients in accordance with an instruction from the CPU 112.

FIG. 8 is a table showing a black extraction method and output masking coefficients to be set in correspondence with each print method and each type (mode) of an image in the apparatus shown in FIG. 7. Mode setting processing operations in respective print methods will be described in turn below with reference to FIG. 8.

[1] Normal Copy Operation a) When the character or map copy mode is selected in accordance with an instruction from the operation unit 113 shown in FIG. 7, the CPU 112 performs a table setting operation for executing black extraction on the basis of equation (3-1) in the black extraction circuit 510. At the same time, the CPU 112 sets matrix coefficients for setting a relatively high ratio of K (a relatively large UCR amount) in the output masking·UCR circuit 507.

With this operation, a print output with high gray reproducibility can be obtained for an original image such as characters, a map, or the like.

b) When the normal copy mode is selected in accordance with an instruction from the operation unit 113, the CPU 112 performs a table setting operation for executing black extraction on the basis of min(C, M, Y) in the black extraction circuit 510. At the same time, the CPU 112 sets matrix coefficients for setting a relatively low ratio of K (a relatively small UCR amount) in the output masking·UCR circuit 507.

With this operation, a print output free from granularity due to noise can be obtained for a normal natural image. Also, a print output free from moiré components can be obtained for a dot document.

[2] When Image From External I/F is Printed (Part 1)

a) When the mode for a C. G, image, characters, or a map is selected in accordance with an instruction from the operation unit 113 shown in FIG. 7 or an I/F command from the external I/F circuit 109, the CPU 112 performs a table setting operation for executing black extraction on the basis of equation (3-1) in the black extraction circuit 510. At the same time, the CPU 112 sets matrix coefficients for setting a relatively high ratio of K (a relatively large UCR amount) in the output masking·UCR circuit 507.

With this operation, gray reproducibility of a print output from an IPU such as a C. G. image, characters, a map image, or the like can be improved.

b) When the normal image mode is selected in accordance with an instruction from the operation unit 113 shown in FIG. 7 or an I/F command from the external I/F circuit 109, the CPU 112 performs a table setting operation for executing black extraction on the basis of min(C, M, Y) in the black extraction circuit 510. At the same time, the CPU 112 sets matrix coefficients for setting a relatively low ratio of K (a relatively small UCR amount) in the output masking·UCR circuit 507.

With this operation, even when natural image data (including a dot document) read from the CCD 101 via an IPU is to be printed out via the IPU again, an output image free from granularity or moire components can be obtained.

[3] When Image From IPU is Printed (Part 2, Part 3)

When the print mode of an image from the IPU is selected in advance in accordance with an instruction from the operation unit 113 shown in FIG. 7, one of the setting contents a) and b) of "[2] When Image From External I/F is Printed (Part 1)" is automatically selected.

In this case, it may be controlled to select a) when the output frequency of a C. G. image, characters, a map image, or the like is high.

Sixth Embodiment

In the fifth embodiment shown in FIG. 7, the black extraction circuit 510 and the output masking·UCR circuit 507 are realized by different circuits. For example, an arrangement shown in FIG. 9 may be adopted. Referring to FIG. 9, reference numerals 501 and 502 denote black extraction & output masking·UCR circuits A and B. One of the outputs from the circuits 501 and 502 is selected by a selector 503.

Therefore, if the black extraction & output masking·UCR circuit A 501 is used for a character or map image, and the black extraction & output masking·UCR circuit B 502 is used for a normal image, the CPU 112 may control the selector 503 to select the output from the circuit 501 in the character image mode, and to select the output from the circuit 502 in the normal image mode. More specifically, the operation shown in FIG. 8 can be realized by the arrangement shown in FIG. 9 in the same manner as in the arrangement shown in FIG. 7.

Figure 10:
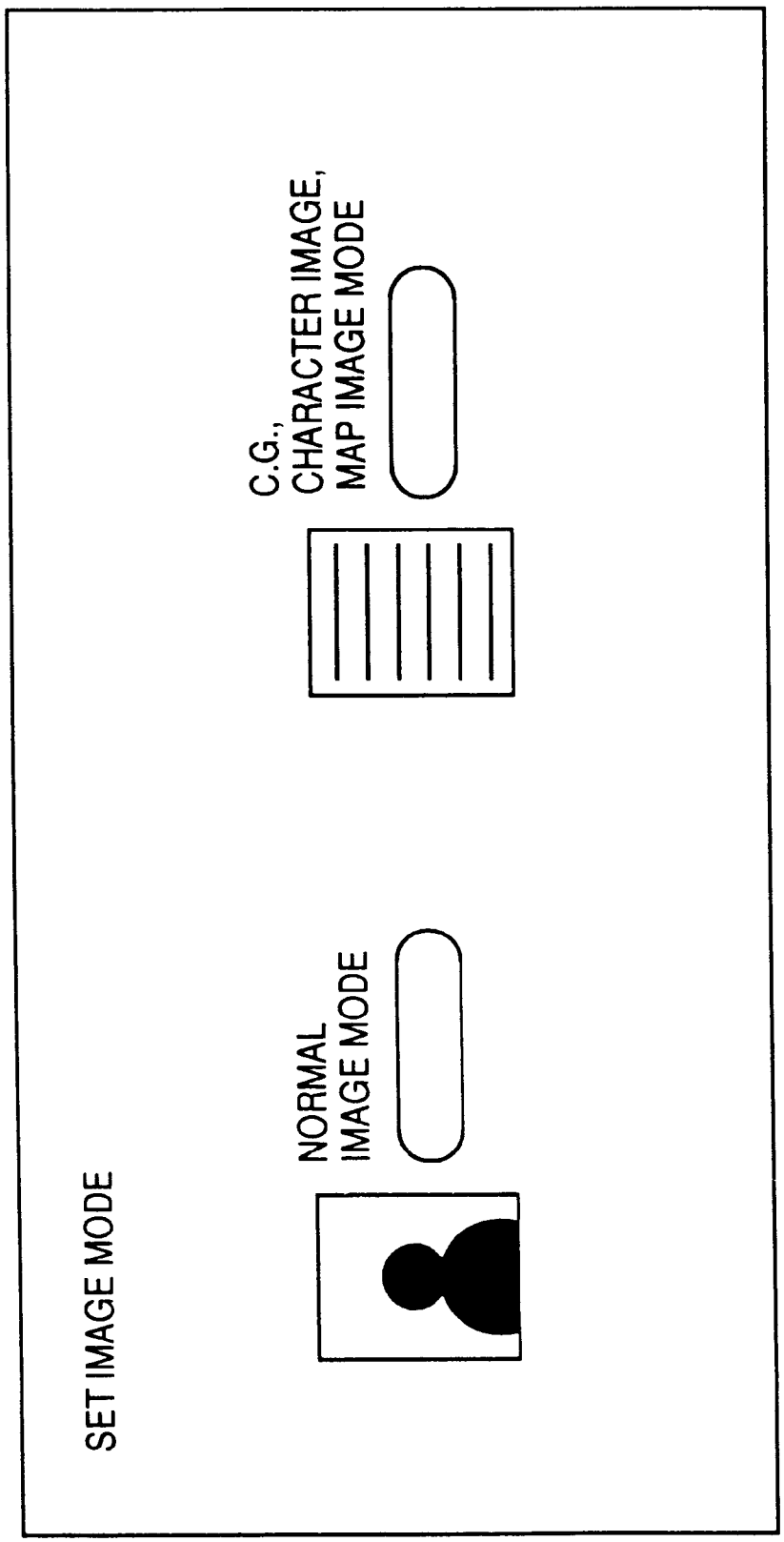
FIG. 10 is a view showing an example of a mode setting operation screen of the copying machine according to the sixth embodiment.

The above-mentioned normal image mode and the character image mode are set and changed on a screen of the operation unit 113 shown in FIG. 10 or by a command from the external I/F circuit. Such an image mode switching operation may be performed in correspondence with each area obtained by dividing a single image.

Seventh Embodiment

For example, in the arrangement shown in FIG. 11, when the contents of a bit map memory 601 are read out in synchronism with an image signal, the normal image mode and the character image mode can be switched in units of areas in one image in correspondence with the contents (1 or 0) of the bit map memory 601.

The contents of the bit map memory 601 can be set by the CPU 112. The contents may be set using the operation unit 113 or may be input using a tablet (not shown).

If the number of bits of the bit map memory allows, different black extraction & output masking·UCR operations may be performed in correspondence with a normal image, a character image, and a map image (although black extraction & output masking·UCR circuits are required).

FIG. 12 shows, as a modification, a case wherein different output masking coefficients are set in correspondence with a map image mode, character image mode, CG image mode, and other image mode (a total of four modes) in the fifth to seventh embodiments. Thus, an optimal output masking coefficient can be set for each image mode.

FIG. 13 shows an example of an image mode switching screen on the operation unit. Thus, the character image mode, the map image mode, and other image mode (corresponding to a character/printed picture mode, a character/photographic paper picture mode, a printed picture mode, and a photographic paper picture mode in the example shown in FIG. 13; these modes are separated since they have different masking coefficients) can be selected.

Eighth Embodiment

In the first to seventh embodiments described above, the "granularity" is improved by multiplying the K signal with the coefficient α or by switching the extraction equation itself. In the eighth to 11th embodiments to be described below, noise is prevented from being mixed in a K signal upon extraction of the K signal.

Figure 14:
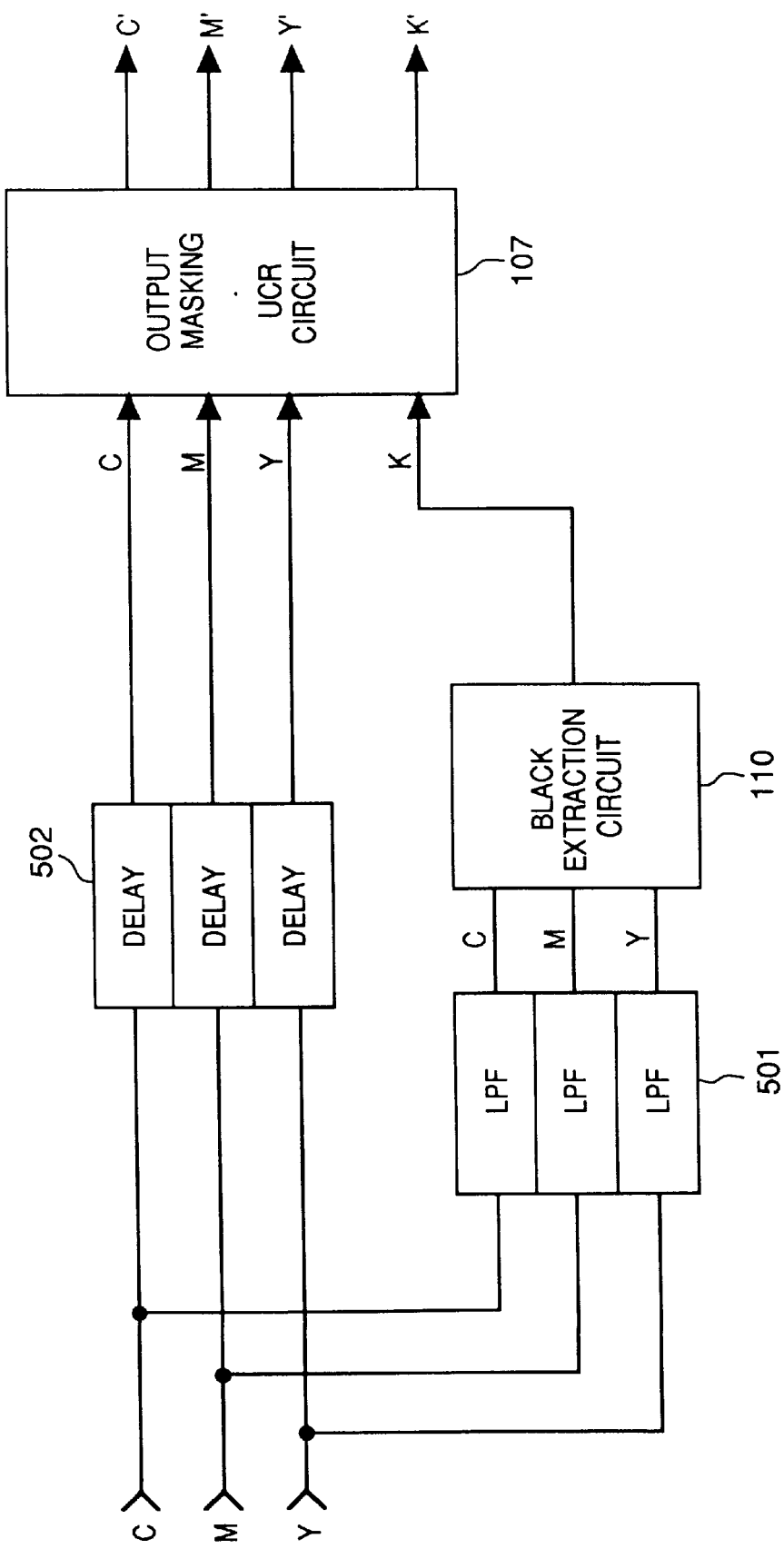
FIG. 14 is a block diagram showing the arrangement of principal part of a signal processing circuit according to the eighth embodiment of the present invention.

More specifically, high-frequency noise components are removed from C, M, and Y signals by three LPFs 501 shown in FIG. 14, and thereafter, the C, M, and Y signals are input to the black extraction circuit 110 to extract a K signal, so that noise in the K signal does not appear as granularity on an image.

Delay circuits 502 shown in FIG. 14 compensate for the delay time of the LPFs 501. Note that the LPF 501 is not limited to a first-order filter.

Ninth Embodiment

Figure 15:
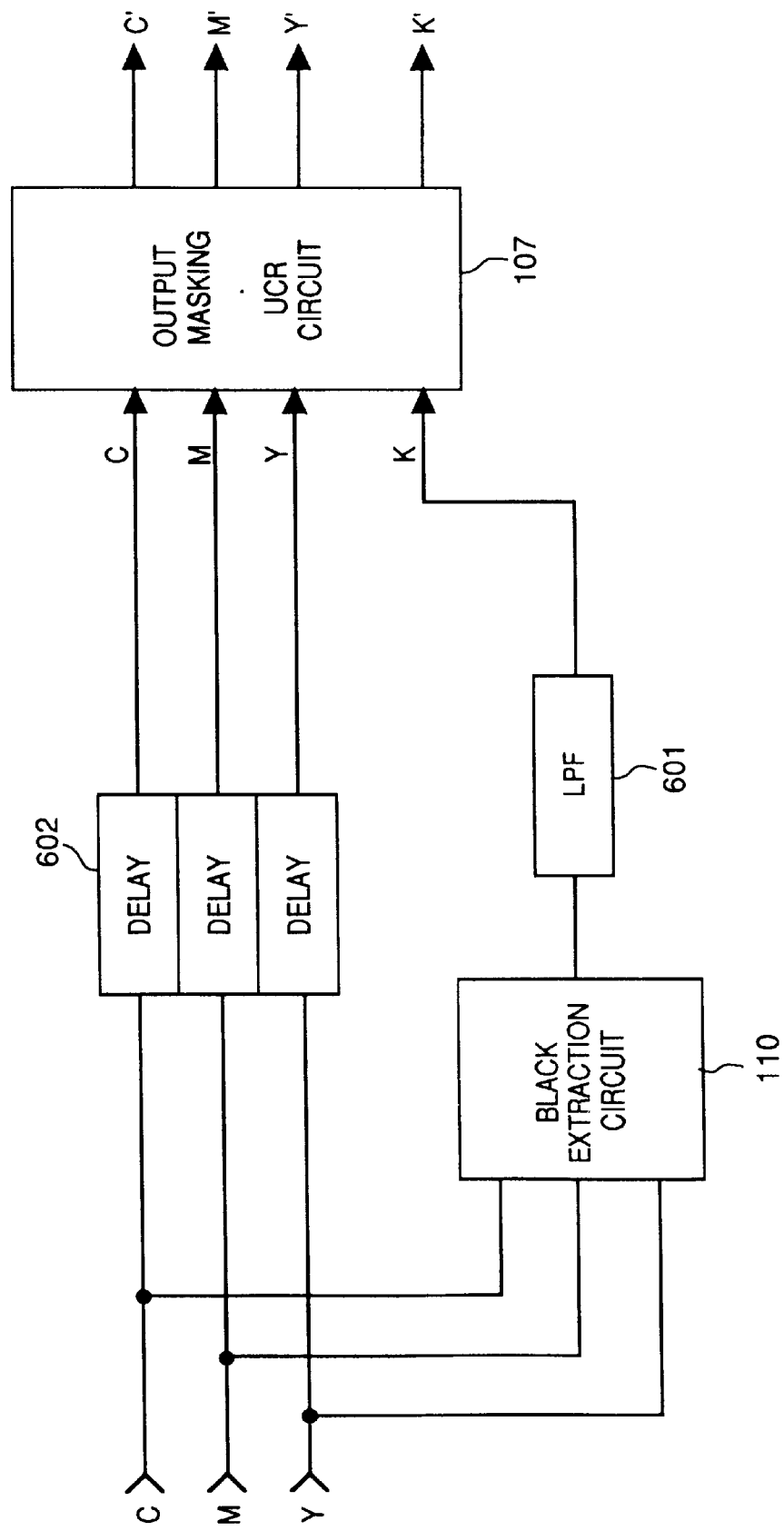
FIG. 15 is a block diagram showing the arrangement of principal part of a signal processing circuit according to the ninth embodiment of the present invention.

In the eighth embodiment, the LPFs 501 are arranged at the input side of the black extraction circuit 110 shown in FIG. 14. In the ninth embodiment, as shown in FIG. 15, an LPF 601 is arranged at the output side of the black extraction circuit 110. With this arrangement, the number of LPFs is decreased from three to one, and substantially the same effect as in the eighth embodiment can be expected.

10th Embodiment

In the eighth and ninth embodiments, high-frequency noise components are removed by the LPFs. However, the present invention is not limited to this. For example, a lower envelope detection circuit may be used.

Figure 16:
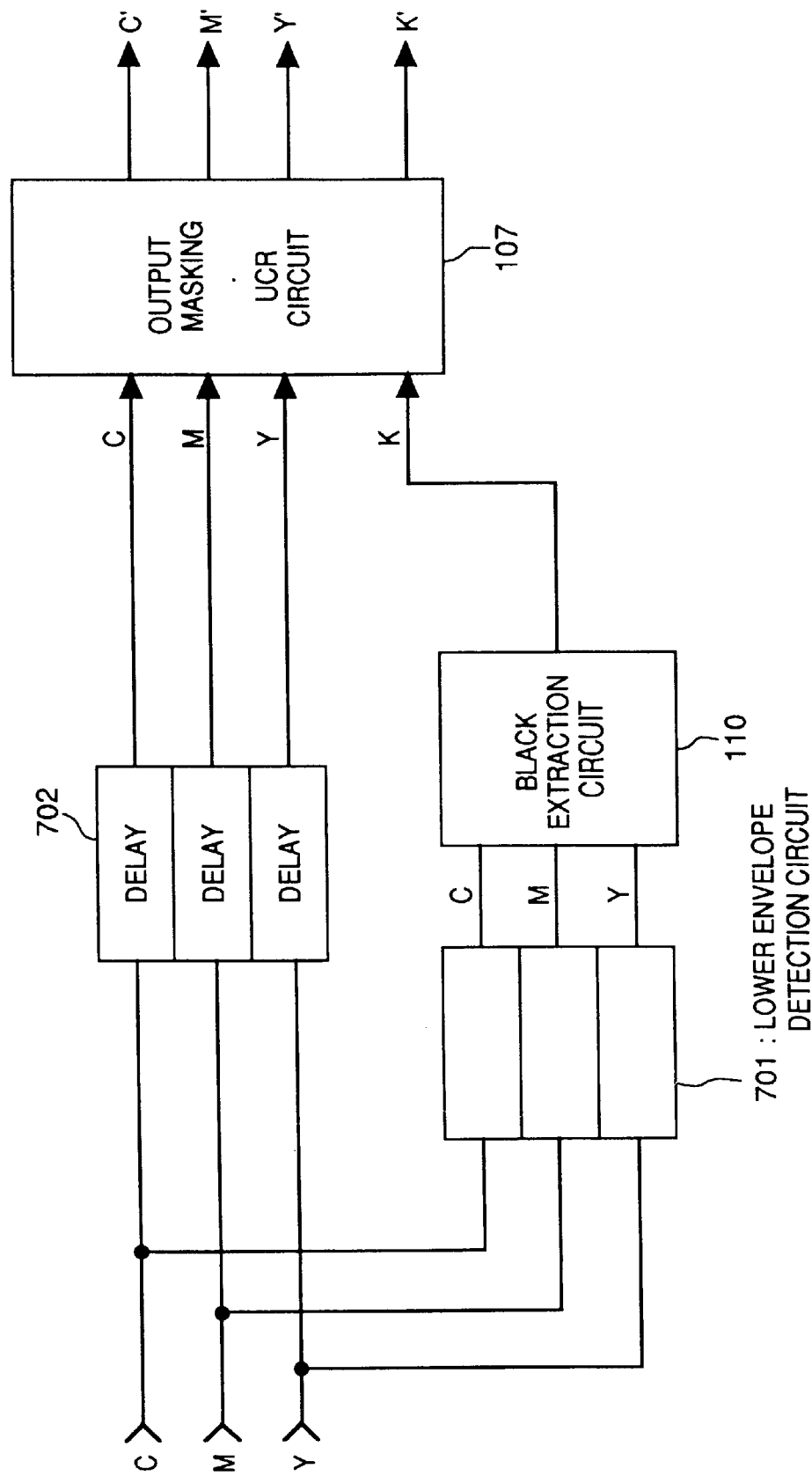
FIG. 16 is a block diagram showing the arrangement of principal part of a signal processing circuit according to the 10th embodiment of the present invention.
Figure 17A:
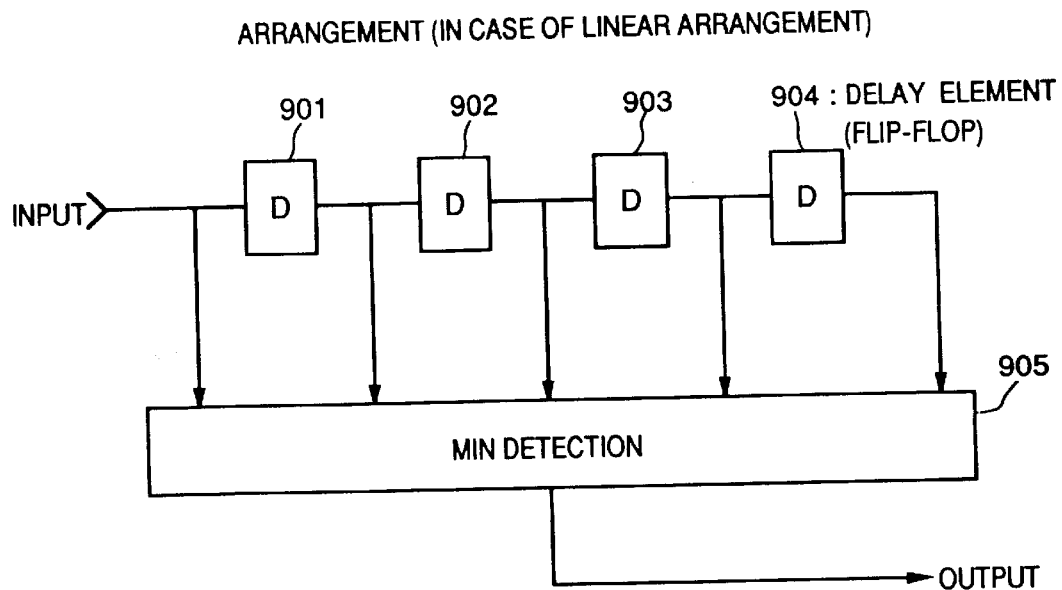
FIG. 17A is a block diagram showing the detailed arrangement of a lower envelope detection circuit shown in FIG. 16.
Figure 17B:
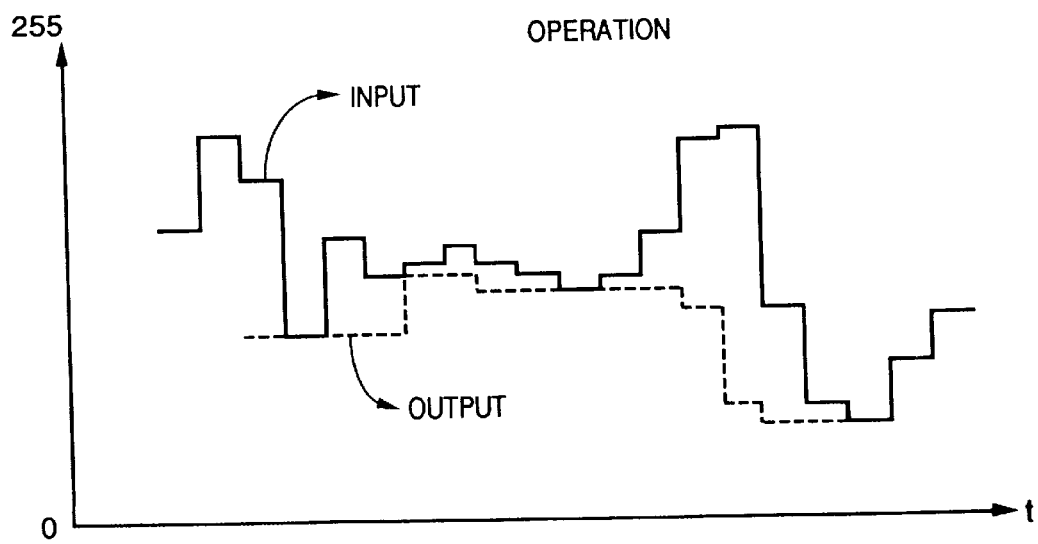
FIG. 17B is a waveform chart for explaining the operation of the circuit shown in FIG. 17A.

FIG. 16 shows an example wherein lower envelope detection circuits 701 are used in place of the LPFS. Each of the lower envelope detection circuits 701 outputs the smallest pixel value of surrounding pixel values, as shown in, e.g., FIG. 17A, and has a function of removing high-frequency components as in the LPF, as can be understood from FIG. 17B.

Figure 18:
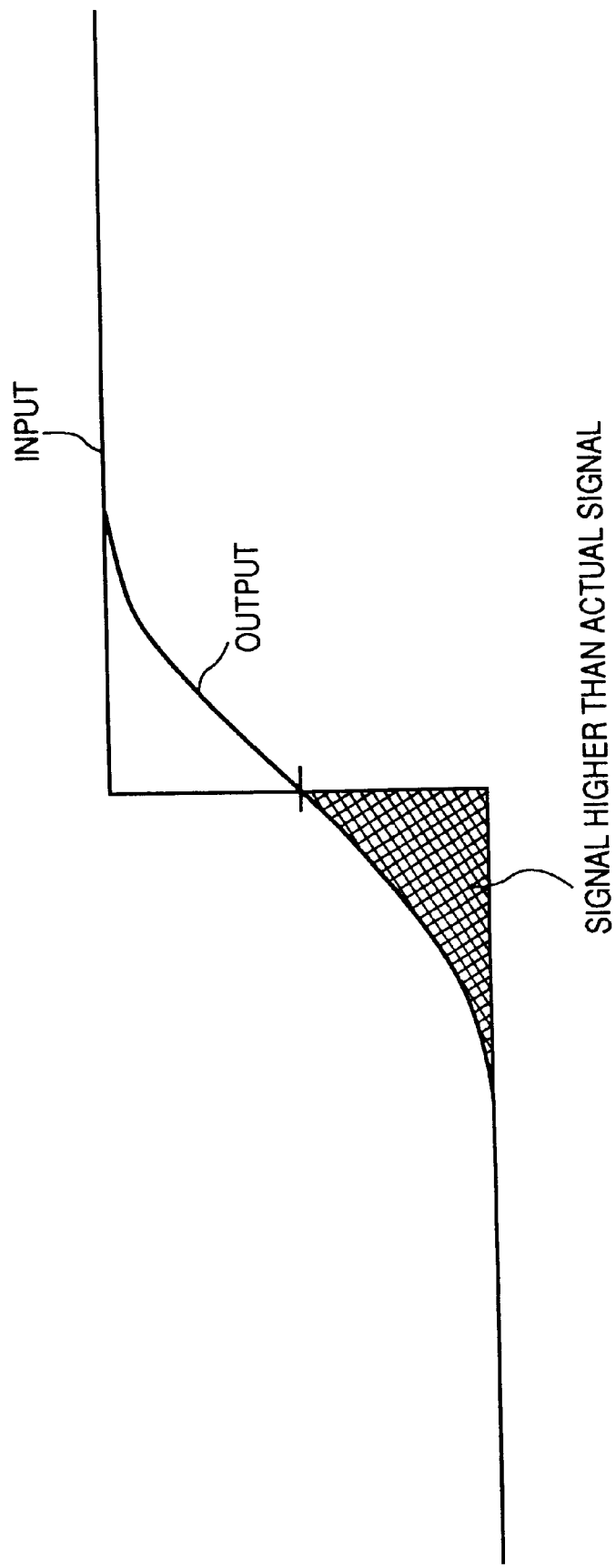
FIG. 18 is a graph showing the input/output characteristics of a black extraction circuit shown in FIGS. 14 and 15.

The reason why the lower envelope detection circuits are used in place of the LPFs is as follows. If a simple LPF is used, C, M, and Y signals higher than actual C, M, and Y signals are input to the black extraction circuit at an edge portion of an image, as indicated by a hatched portion in FIG. 18. The lower envelope detection circuits are used for preventing a K signal higher than an actual one from being extracted.

11th Embodiment

Figure 19:
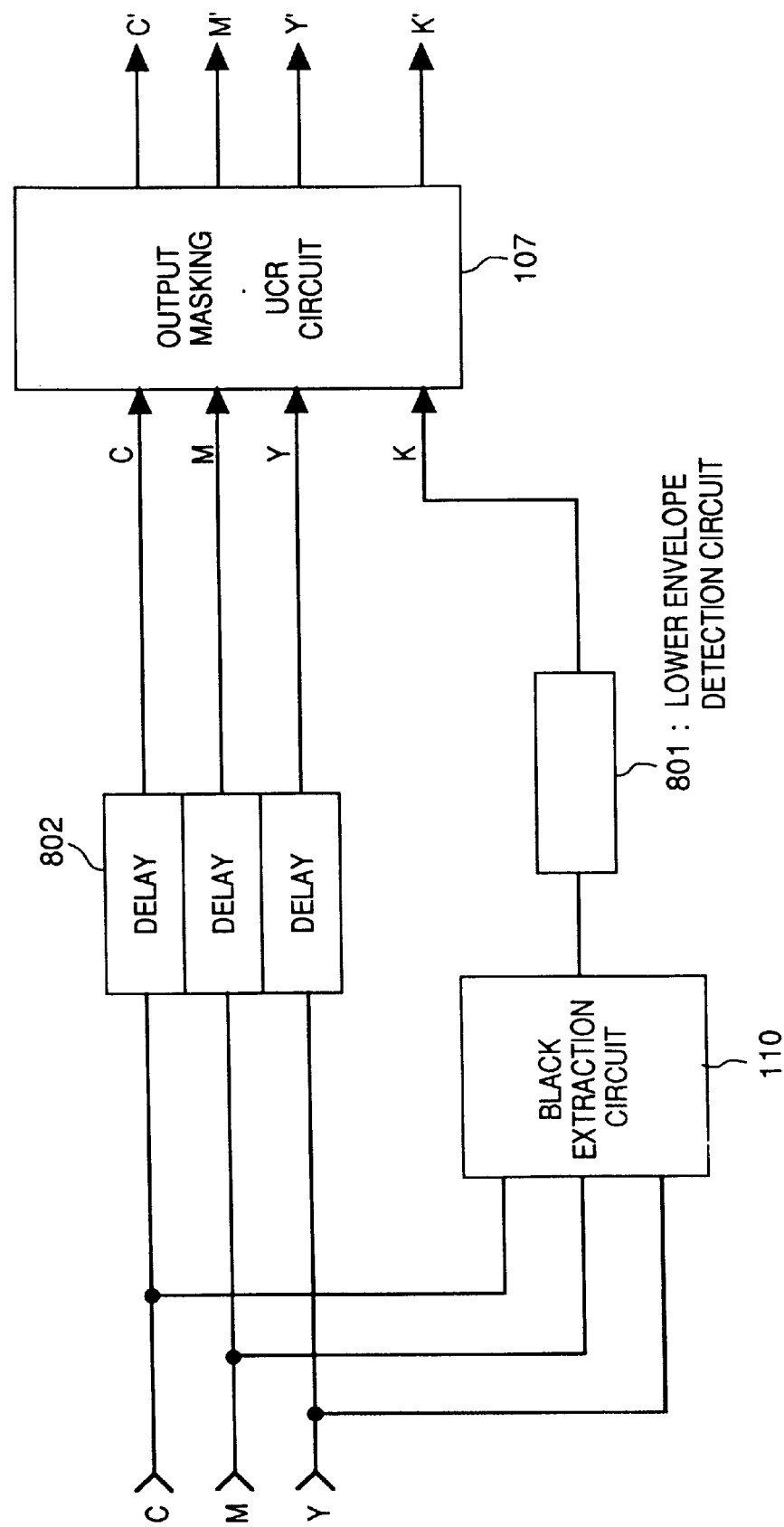
FIG. 19 is a block diagram showing the arrangement of principal part of a signal processing circuit according to the 11th embodiment of the present invention.

FIG. 19 shows the 11th embodiment. In this embodiment, a lower envelope detection circuit 801 is arranged at the output side of the black extraction circuit 110 as in the 10th embodiment.

With this arrangement, the number of lower envelope detection circuits can be decreased from three to one, and an equivalent effect can be expected.

Note that the present invention may be applied to either a system constituted by a plurality of devices or an apparatus consisting of a single device. Also, the present invention may be applied to a case wherein the invention is achieved by supplying a program to the system or apparatus.

As described above, according to the present invention, when an image from a scanner or a C. G. image is to be printed out, optimal signal processing for removing granularity can be performed.

Since a K signal can be extracted without mixing a granularity component in the K signal, the granularity itself can be prevented from becoming conspicuous, and high gray reproducibility can be maintained.

The present invention is not limited to the above embodiments and various changes and modifications can be made within the spirit and scope of the present invention.

Therefore, to apprise the public of the scope of the present invention the following claims are made.

What is claimed is:

1. An image processing apparatus comprising:

input means for inputting color image data from an external unit;

generating means for generating a black color component from the color image data; and setting means for setting said generating means to a first black component generating mode suitable for a computer generated image and a second black component generating mode suitable for a scanned image based on a command from said external unit.

2. The apparatus according to claim 1, further comprising a user interface for inputting a user indication indicating the first or second black color component generating mode.

3. The apparatus according to claim 2, wherein the setting means sets said generation means for each of plural areas in a divided image.

4. The apparatus according to claim 1, wherein said setting means sets said generating means to a map image mode for processing a map image.

5. The apparatus according to claim 1, further comprising forming means for forming a color image based on a plurality of color components including the black color component generated by said generating means.

6. The apparatus according to claim 1, further comprising a scanner for scanning an original image, wherein said setting means sets said generating means to the second black color component generating mode in a case that a black color component is generated from color image data representing a photo image scanned by said scanner.

7. The apparatus according to claim 1, wherein said generating means generates a black color component by UCR processing.

8. The apparatus according to claim 1, further comprising masking processing means for performing masking processing, wherein said setting means sets a masking processing condition, based on a command from said external unit.

9. An image processing method comprising the steps of:

inputting color image data from an external unit;

generating a black color component from the color image data and setting a first black color component generating mode suitable for a computer generated image and a second black color component generating mode suitable for a scanned image, based on a command from said external unit.

10. A computer-readable medium storing computer-executable process steps to perform an image processing method, the steps comprising:

an inputting step to input color image data from an external unit;

a generating step to generate a black color component from the color image data; and a setting step to set a first black color component generating mode suitable for a computer generated image and a second black color component generating mode suitable for a scanned image, based on a command from said external unit.

* * * * *

UNITED STATES PATENT AND TRADEMARK OFFICE
CERTIFICATE OF CORRECTION

PATENT NO. : 6,118,558
DATED : September 12, 2000
INVENTOR(S) : Ohashi et al.

Page 1 of 1

It is certified that error appears in the above-identified patent and that said Letters Patent is hereby corrected as shown below:

Title page,

Under References Cited, FOREIGN PATENT DOCUMENTS:

"2/1995" (all 3 occurrences) should read -- 8/1995 --.

Column 4,
Line 38, "αis" should read -- α is --; and
Line 40, "value a" should read -- value α --.

Column 5,
Line 43, "K=minfmin/max+ (1-min/max) (min/255)$^2$}(3-1)" should read
-- K=min{min/max+ (1-min/max) (min/255)$^2$}(3-1) --; and
Line 49, " "0"." should read -- "0"}. --.

Column 6,
Line 60, "a" should read -- α --.

Signed and Sealed this

Sixteenth Day of October, 2001

Attest:

NICHOLAS P. GODICI
Attesting Officer
Acting Director of the United States Patent and Trademark Office